Jan. 23, 1940.  A. C. RUDEN  2,187,753
METHOD OF AND APPARATUS FOR ROLLING BLANKS
Original Filed July 8, 1938   10 Sheets-Sheet 1

INVENTOR.
Arthur C. Ruden
BY Fay, Oberlin & Fay
ATTORNEYS

Jan. 23, 1940.　　　A. C. RUDEN　　　2,187,753
METHOD OF AND APPARATUS FOR ROLLING BLANKS
Original Filed July 8, 1938　　10 Sheets-Sheet 3

INVENTOR.
Arthur C. Ruden
BY Fay, Oberlin & Fay
ATTORNEYS

INVENTOR.
Arthur C. Ruden
BY Fay, Oberlin & Fay
ATTORNEYS

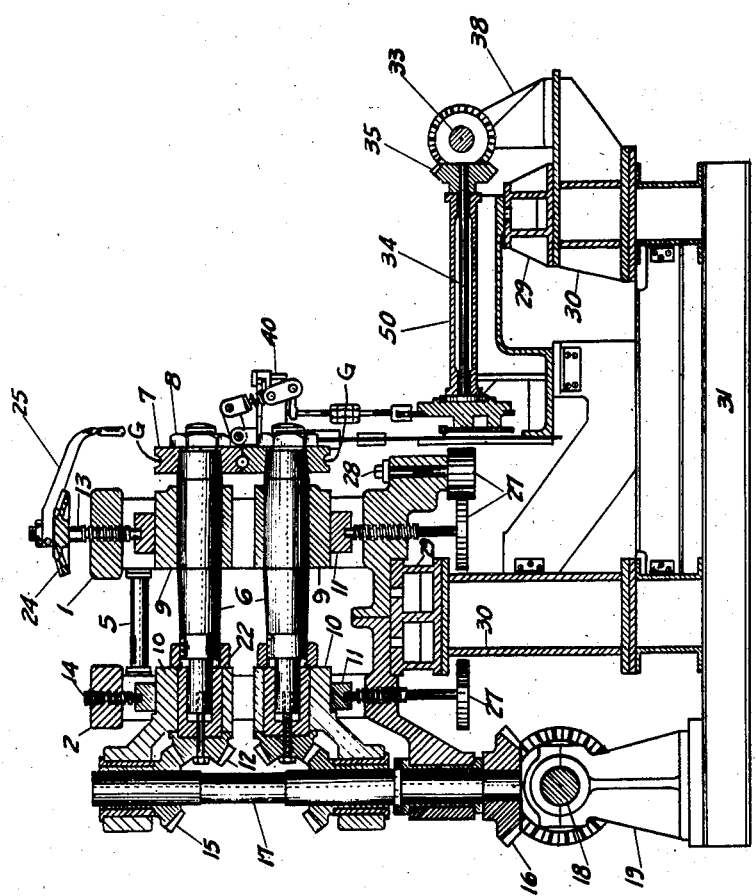

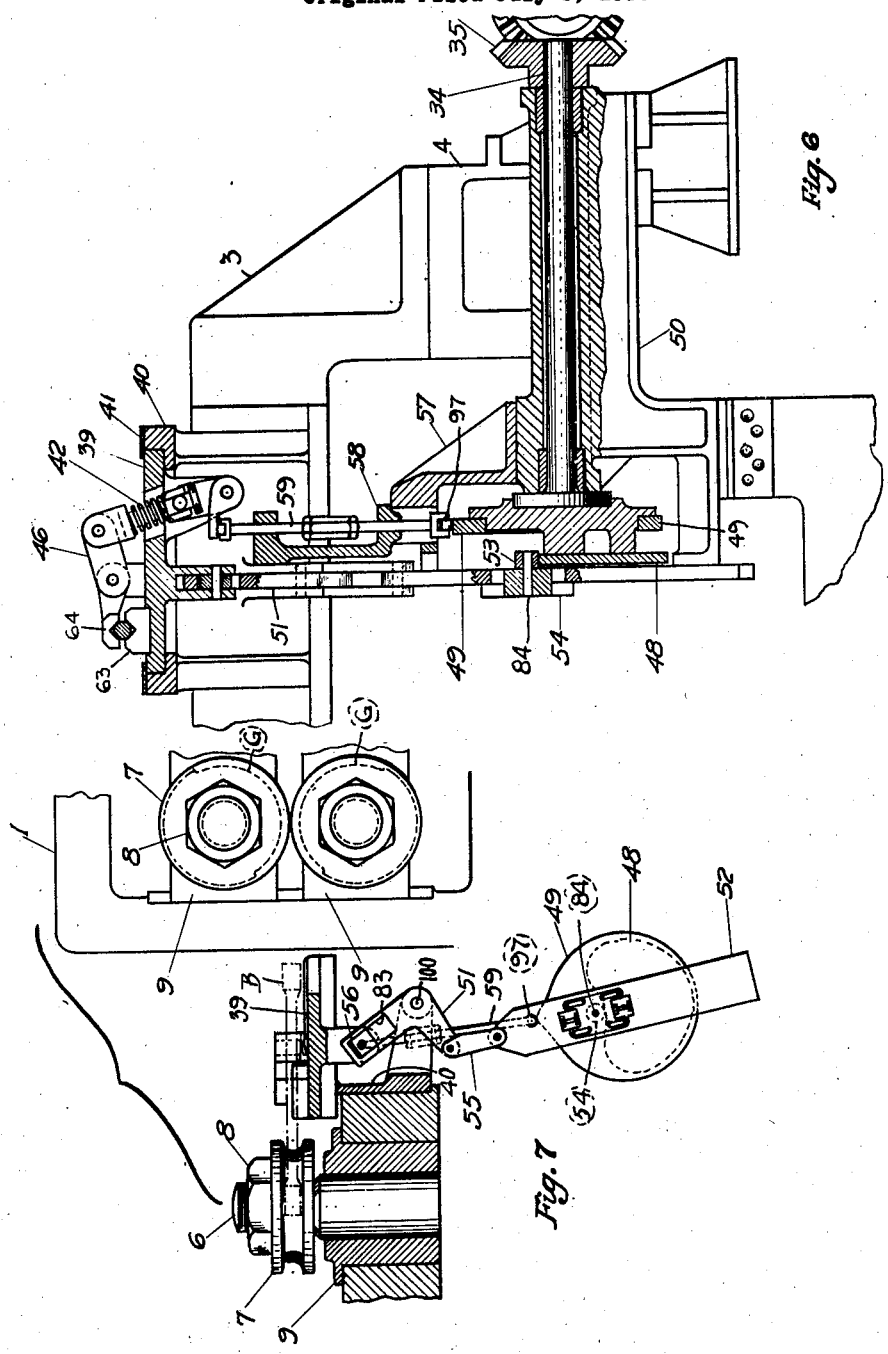

Jan. 23, 1940.   A. C. RUDEN   2,187,753
METHOD OF AND APPARATUS FOR ROLLING BLANKS
Original Filed July 8, 1938   10 Sheets-Sheet 7

INVENTOR.
Arthur C. Ruden
BY Fay, Oberlin & Fay
ATTORNEYS

Jan. 23, 1940.  A. C. RUDEN  2,187,753
METHOD OF AND APPARATUS FOR ROLLING BLANKS
Original Filed July 8, 1938    10 Sheets-Sheet 8
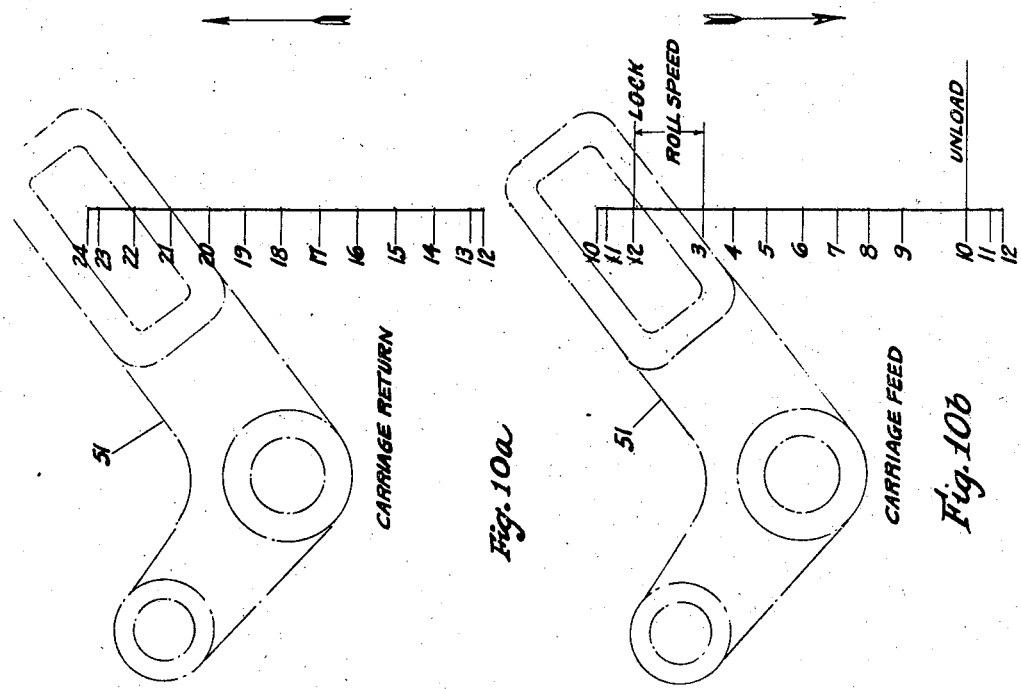
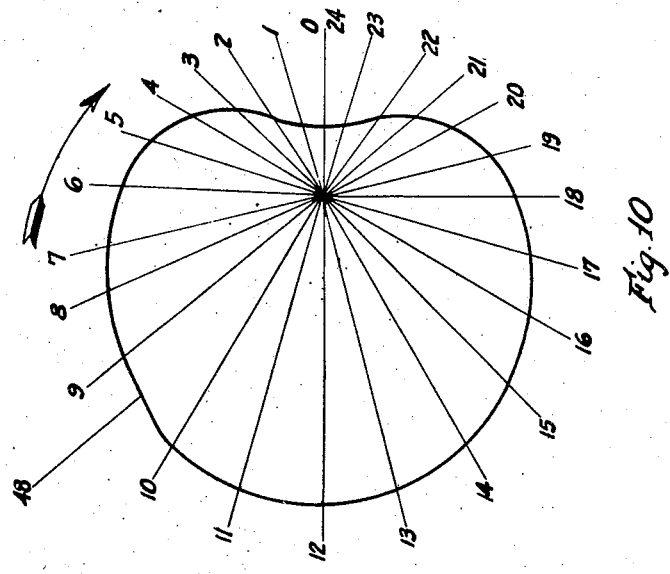
INVENTOR.
Arthur C. Ruden
BY Fay, Oberlin & Fay
ATTORNEYS Jan. 23, 1940.     A. C. RUDEN     2,187,753
METHOD OF AND APPARATUS FOR ROLLING BLANKS
Original Filed July 8, 1938    10 Sheets-Sheet 9
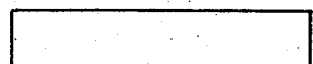
Fig.11   KB
Fig.12
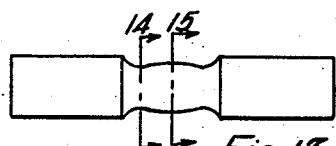
Fig.13
Fig.14
Fig.15
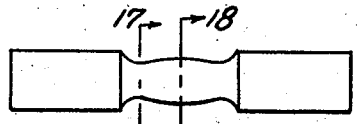
Fig.16
Fig.17
Fig.18
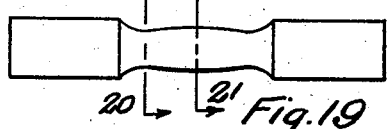
Fig.19
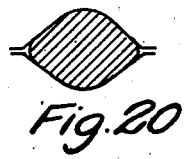
Fig.20
Fig.21
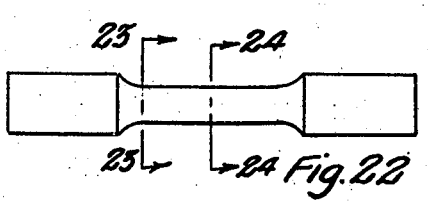
Fig.22
Fig.23
Fig.24
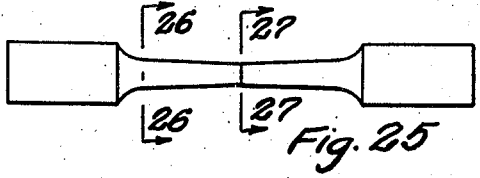
Fig.25
Fig.26
Fig.27
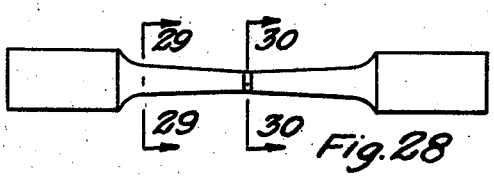
Fig.28
Fig.29
Fig.30
INVENTOR.
Arthur C. Ruden
BY Fay, Oberlin & Fay
ATTORNEYS.

Jan. 23, 1940.　　　　A. C. RUDEN　　　　2,187,753
METHOD OF AND APPARATUS FOR ROLLING BLANKS
Original Filed July 8, 1938　　10 Sheets-Sheet 10

INVENTOR.
Arthur C. Ruden
BY Jay. Oberlin & Jay
ATTORNEYS

Patented Jan. 23, 1940

2,187,753

UNITED STATES PATENT OFFICE 2,187,753

METHOD OF AND APPARATUS FOR ROLLING BLANKS

Arthur C. Ruden, Euclid, Ohio, assignor to Mid-West Forge Company, Cleveland, Ohio, a corporation of Ohio Application July 8, 1938, Serial No. 218,141
Renewed April 14, 1939

12 Claims. (Cl. 80—26)

This invention relates, as indicated, to a method of and apparatus for rolling blanks, but has reference more particularly to the die rolling of such blanks by means of successive sets of die rolls.

It has heretofore been proposed to roll blanks and the like through a series of sets of rolls arranged in tandem to form axles, brake shoe keys, wedges and other symmetrical and asymmetrical articles, but in no case have articles of a high degree of uniformity and freedom from flash and other imperfections been produced automatically and without the intervention of the human element.

It is a primary object of the present invention to produce rapidly and automatically and in large quantities, such as is required by the automotive and other industries, articles of the aforesaid character, particularly axles, shafts, steering knuckles, crank shafts and the like, which shall be characterized by a high degree of uniformity and freedom from flash and other surface imperfections, and which retain desired strength and grain and fiber characteristics.

Other objects of the invention are the elimination of the human or personal element in the manufacture of roll-forged articles, the production of such articles in a more uniform manner than is possible with manual control of the various operations, and the avoidance of the necessity of reheating the blank or partly finished product at any stage in the various operations.

Another object of the invention is to provide a method of die rolling blanks in which the movement of the blank through the successive sets of die rolls is uninterrupted, but in which the blank is held against transverse movement during its passage from one set of rolls to the next.

Another object of the invention is to provide a method of die rolling blanks, in which the blank is first rolled to a form approaching that ultimately desired, and is then gripped before it has been discharged from the first set of rolls, but while still in motion, and is passed into correct registration with depressions in a succeeding set of die rolls in which the blank is further acted upon to further form the blank.

Another object of the invention is to provide a method of the character described, in which the blank, before it has been discharged from one set of rolls and while it is still in motion, is clamped to a support and positively fed to the next set of rolls by movement of its support in synchronism with the rotation of said next set of rolls, whereby the configurations on the blank will register correctly with depressions in said next set of rolls.

A further object of the invention is to provide apparatus for accomplishing the foregoing objects, which apparatus shall include a plurality of sets of rolls arranged so that the blank must pass completely out of one set of rolls before being acted upon by the next set of rolls and means for automatically transferring the blanks from one set of rolls to the next, said means operating in synchronism with said sets of rolls.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

In said annexed drawings:

Fig. 5 is an enlarged transverse cross-sectional view of the mill, taken on the line 5—5 of Fig. 2, and showing one of the vertical mill stands;

Fig. 6 is an enlarged fragmentary cross-sectional view, taken on the line 6—6 of Fig. 1, and showing the carriage reciprocating and blank clamping mechanism;

Fig. 7 is an enlarged fragmentary view, partly in section and partly in elevation, taken on the line 7—7 of Fig. 1;

Fig. 10 is a face view of the carriage reciprocating cam;

Fig. 10a is a view illustrating in more or less diagrammatic manner, the return movement of the carriage;

Fig. 10b is a view similar to Fig. 10a, but illustrating the forward or feeding movement of the carriage;

Fig. 11 is a side elevation of a blank used for forming a pair of connected steering knuckles;

Fig. 12 is an end view of the blank shown in Fig. 11;

Fig. 13 is a view showing the blank of Fig. 11 after being rolled in the first set of rolls;

Figure 32:
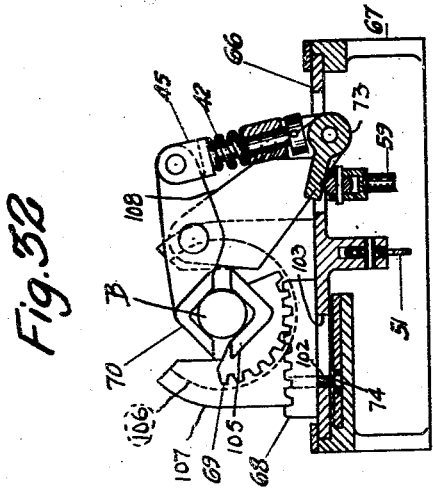
Figure 33:
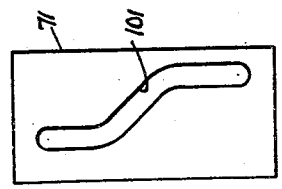
Figure 31:
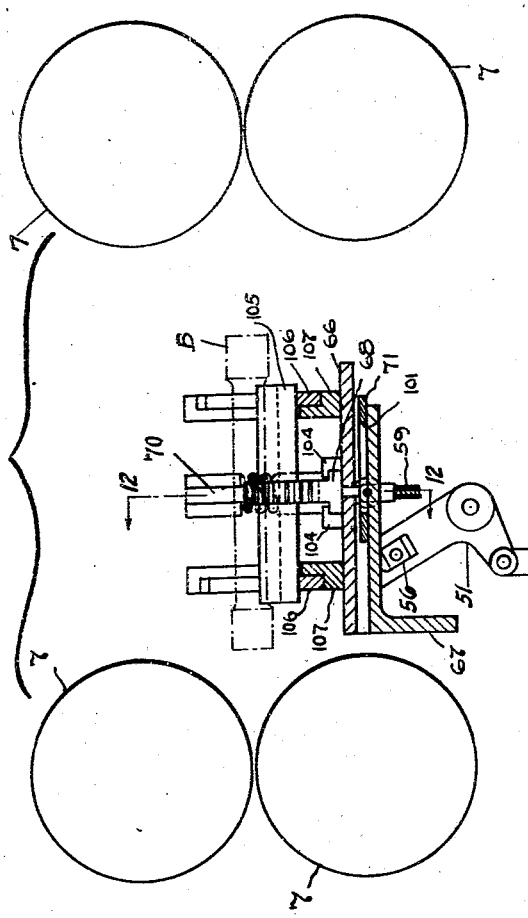

Figs. 14 and 15 are cross sectional views, taken on the lines 14—14 and 15—15, respectively, of Fig. 13;

Fig. 16 is a view showing the article of Fig. 13, after being rolled in the second set of rolls;

Figs. 17 and 18 are cross sectional views, taken on the lines 17—17 and 18—18, respectively, of Fig. 16;

Fig. 19 is a view showing the article of Fig. 16, after being rolled in the third set of rolls;

Figs. 20 and 21 are cross sectional views, taken on the lines 20—20 and 21—21, respectively, of Fig. 19;

Fig. 22 is a view showing the article of Fig. 19, after being rolled in the fourth set of rolls;

Figs. 23 and 24 are cross sectional views, taken on the lines 23—23 and 24—24, respectively, of Fig. 22;

Fig. 25 is a view showing the article of Fig. 22, after being rolled in the fifth set of rolls;

Figs. 26 and 27 are cross sectional views, taken on the lines 26—26 and 27—27, respectively, of Fig. 25;

Fig. 28 is a view showing the article of Fig. 25, after being rolled in the sixth or last set of rolls;

Figs. 29 and 30 are cross sectional views, taken on the lines 29—29 and 30—30, respectively, of Fig. 28;

Fig. 31 is a view of a portion of a modified form of mill, showing a blank rotating device for quarter-turning the blank between mill stands;

Fig. 32 is a view, partly in elevation, and partly in section, taken on the line 32—32 of Fig. 31, and Fig. 33 is a plan view of the quarter-turning complete.

Referring more particularly to the form of the mill shown in Figs. 1 to 10b inclusive, the mill consists, as shown, of alternately arranged horizontal and vertical mill stands, respectively and generally designated by the reference characters H and V. The spaces between these stands gradually increase in accordance with the progressive lengthening of the blank which is being forged, the number of stands required and the exact spacing therebetween being determined by the nature of the article which is to be produced. An essential requirement in this connection is that the sets of rolls be spaced a greater distance apart than the length of the blank.

The vertical stands comprise transversely spaced housings 1 and 2 and the horizontal stands comprise superimposed housings 3 and 4, the housings 1 and 2 being maintained in spaced relation by means of spacers 5.

As shown most clearly in Fig. 5, each of the vertical stands further includes vertically spaced shafts 6, each having secured to one end a roll 7, the rolls being maintained in position by means of nuts 8, and the shafts being journalled in chocks 9 and 10. These chocks are movable vertically along suitable guides of the housings 1 and 2.

The upper chocks 9 and 10 are engaged by breakers 11, and the lower chocks 9 and 10 are engaged at the bottom by similar breakers 11. Each of the shafts 6 has secured to its opposite end a pinion 12. The upper breakers 11 are engaged by adjusting screws 13 and 14, respectively in threaded engagement with the bridge portions of housings 1 and 2, and extending therethrough. The screws 13 and 14 have secured to their upper ends adjusting wheels 24 and adjusting wheel levers 25, whereby the upper shaft 6 may be vertically adjusted. Similar vertical adjustment for the lower shaft 6 is provided, in the form of adjusting screws which are rotatable by means of spur gears 27 driven by a screw adjusting shaft 28. Axial adjustment of the rolls 6 is effected by means of roll adjusting nuts 22.

Figure 4:
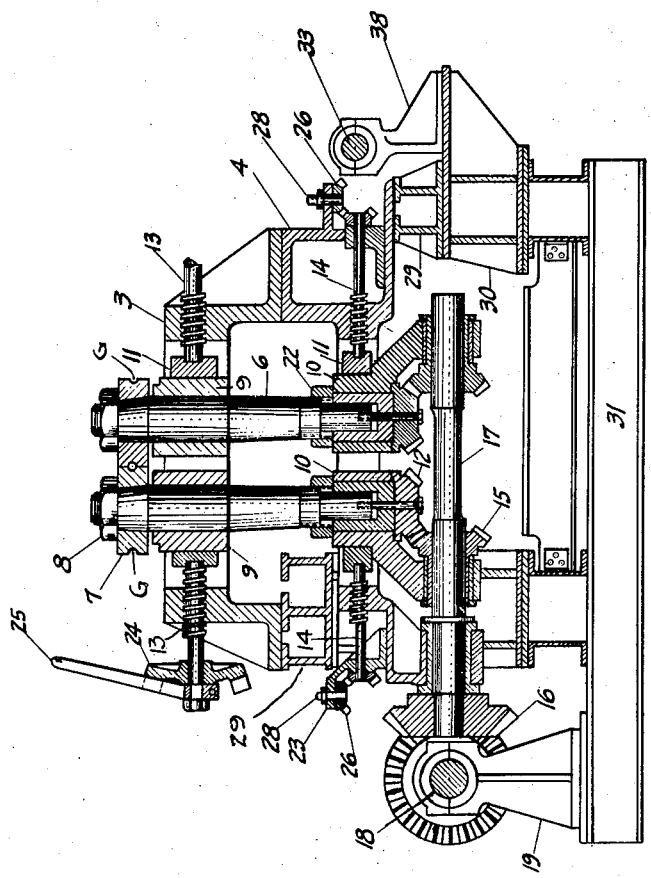
Fig. 4 is an enlarged transverse cross-sectional view of the mill, taken on the line 4—4 of Fig. 2, and showing one of the horizontal mill stands.

Each of the horizontal stands, as shown most clearly in Fig. 4, further includes transversely spaced shafts 6, each having secured to its upper end a roll 7. Since the construction of these stands is substantially the same as that of the vertical stands, corresponding parts have been given the same reference characters, so that the function of such parts will be readily understood, and further description thereof is believed unnecessary.

The mill stands are mounted on rails 29 and may be adjusted along these rails to vary the spacings between the various sets of die rolls. The rails 29, are, in turn mounted on rail supports 30, and these, in turn, are supported on the main frame or base 31 of the roll forging machine. The base 31 supports substantially all of the operating mechanism to be hereinafter described.

The die rolls may have any suitable designs, patterns or grooves G formed in their peripheries, depending upon the nature of the work which is being rolled, the action of the first set of die rolls being such as to cause the blank which is rolled therebetween to approach somewhat the form ultimately desired. Each succeeding set of die rolls will then cause the blank to approach more closely the ultimate shape desired and attained by the last set. Moreover, alternate sets of rolls are preferably arranged in a plane at right angles to the plane of the other sets of rolls, so as to avoid the formation of flash on the blank as it progresses through the mill, without requiring quarter-turning of the blank. As will appear later, however, in a modified form of mill, the rolls may all be in the same plane, provision being made for quarter-turning the blank between mill stands.

The rolls of all the mill stands are driven at a uniform speed by means of driving mechanism comprising a motor driven main drive shaft 18, journalled in bearing brackets 19, and extending substantially the entire length of the mill, mitre gears 16, mill shafts 17, and bevel gears 15, the latter meshing with the pinions 12.

Since the present mill is so designed that the blank must be completely out of one set of rolls before being acted upon by the next set of rolls, it is imperative that means be provided for transferring the blank from each set of rolls to the next in such manner that the forward end of the blank will enter the next set of rolls at a predetermined point on the periphery thereof. In other words, the blank must be fed to each set of rolls in synchronism with the rotation of such set, so that the configurations on the blank will register correctly with the depressions in the rolls. To this end, carriages or supports are provided between each set of rolls, onto which the blank is discharged by the rolls, the blank being clamped to the support before it has been completely discharged by the rolls, but while still in motion, and being positively fed to the next set of rolls by movement of the support in synchronism with the rotation of said next set of rolls.

In addition, means must be provided for transferring the blank to the first set of rolls so that the formed end of the blank will enter such first set of rolls at a predetermined point on the periphery thereof. To this end, another carriage or support is provided in advance of the first set of rolls, on which the blank is placed, and is positively fed to said first set of rolls by movement of said support in synchronism with the rotation of said first set of rolls.

Secured to the housings 3 of each of the horizontal mill stands is a pair of brackets 40, there being one bracket in advance of the first mill stand and one bracket in advance of each of the succeeding mill stands. Mounted on each bracket is a carriage 39 which has reciprocatory movement in the direction of rolling, each carriage being retained against vertical displacement from the bracket by means of keepers 41.

Mounted on and rigidly secured to the first carriage is a V block 80, at the rear of which is an upwardly extending flange 81, through which a screw 72 extends. By adjustment of this screw, which constitutes a gauge or stop for the rear end of the blank to be forged, the forward end of the blank may be caused to enter the first set of rolls at a predetermined point in the periphery thereof, within the limits of movement of the screw.

The succeeding carriages are similar in construction to the first carriage; and are similarly mounted. Each is provided on its upper surface with a V block 63, similar to the V block 80, but with the V open at both ends. As the blank is discharged from each set of rolls, it passes onto these V blocks, being clamped to the block before it has been completely discharged from the rolls, by mechanism which will be presently described.

Reciprocatory movement of the carriages, between the blank receiving and blank delivery positions is effected by mechanism, which is most clearly shown in Figs. 1, 3, 6, 7 and 8.

Each carriage has depending therefrom a pair of spaced ears or lugs 39a to which is pivotally secured, as by means of a pin 82 a bearing block 56, which is slidable in a slot 83 in one arm of a bell crank lever 51. The lever 51 is pivoted, as at 100, to the carriage bracket 40. The other arm of lever 51 is pivotally connected to one end of a link 55, the opposite end of which is pivoted to the upper end of a roller slide 52. The slide 52 carries a block 54 which is adjustable along the slide, and is provided with a pin 84, carrying a cam roller 53. Roller 53 bears against the periphery of a cam 48, driven by a cam shaft 34, journalled in a bracket 50.

The cam shafts 34 are driven in unison through the intermediary of main drive shaft 18, a cross shaft 20, journalled in bearing brackets 21, bevel gears 36 and 37, carriage drive shaft 33, journalled in bearing brackets 38, and mitre gears 35. As will be apparent from Fig. 7, rotation of the cams 48 will result in reciprocatory movement of the carriage 39.

Mechanism is also provided for clamping the blank to the V block before it has been completely discharged by one set of rolls, and for releasing the bar as soon as control or assumption thereover is exercised by the net set of rolls, such mechanism being best shown in Figs. 1, 3, 5, 6, 7, 8 and 9.

Such mechanism comprises a clamp block 64, having a V groove therein, keyed to a rock shaft 85, which is journalled in a housing 47 mounted in the carriage 39 adjacent the V block 63. To the opposite end of the shaft 85 is keyed a lever arm 46, pivoted, as at 86, to a clevis 45, from which extends a post or stem 87, which passes through a trunnion block 44, having a stop collar 88 secured to its end. A spring 42 is mounted on the stem 87 between the base of clevis 45 and the block 44.

The block 44 is pivotally secured to the arms 89 of a bell crank 73, keyed to a shaft 90, journalled in depending ears or lugs 91 of the carriage 39. The other arm 92 of the lever 73 bears against a roller 60 mounted in the upper end of a push rod 59. The shaft 90, to which the lever 73 is keyed, has keyed to one end thereof a clevis-like member 93, upon which is pivotally mounted a spring seat 94. A similar spring seat 95 is pivotally mounted in depending ears 96 of the carriage 39, and a spring 43 is interposed between the seats 94 and 95. The carriage bracket 40 is additionally provided with a cam 61, which, as will presently appear, is adapted to coact with the arm 92 of bell crank lever 73 for the purpose of releasing the clamp.

The push rod 59 is mounted for reciprocal movement in bearing portions of a bracket 58, and is provided at its lower end with a roller 97, which rests on the periphery of a cam 49. Cam 49 is affixed to the same member upon which the cam 48 is mounted, and is rotated by means of the cam shaft 34. The actuation of the clamps is thus synchronized with the movements of the carriages.

In addition to the parts which have been described, the apparatus also includes a conveyor 32, by means of which the hot blanks, bars or billets to be forged or die-rolled, are carried to a gravity feed table 98, whence they pass onto the first V block 80. After emerging from the last set of rolls, the blanks are deposited on a second gravity discharge table 99, whence they pass onto a conveyor 65, which removes them to any desired point, for further treatment.

Having thus described in some detail the principal features and construction of the apparatus, the operation will now be briefly described, as applicable, for example, to the rolling of an automobile axle.

Figure 1:
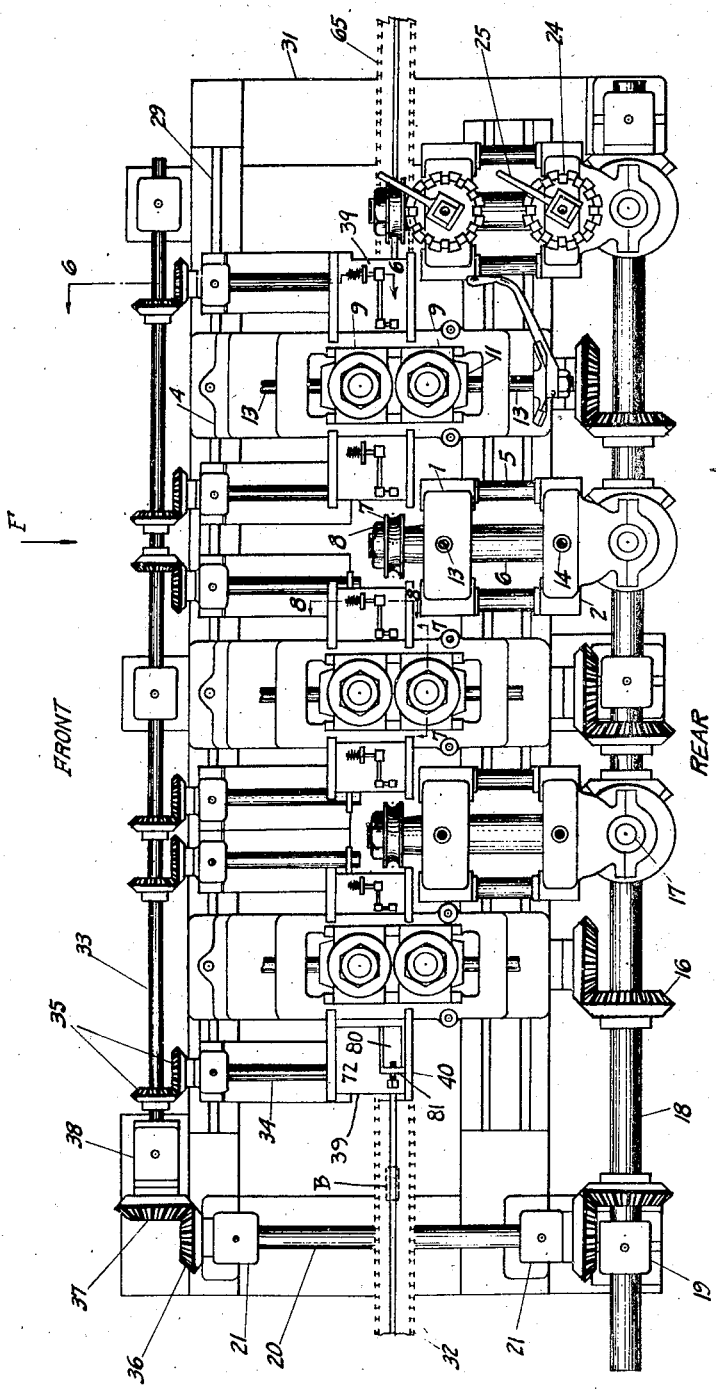
Fig. 1 is a plan view of a rolling mill embodying the novel features of the invention.
Figure 2:
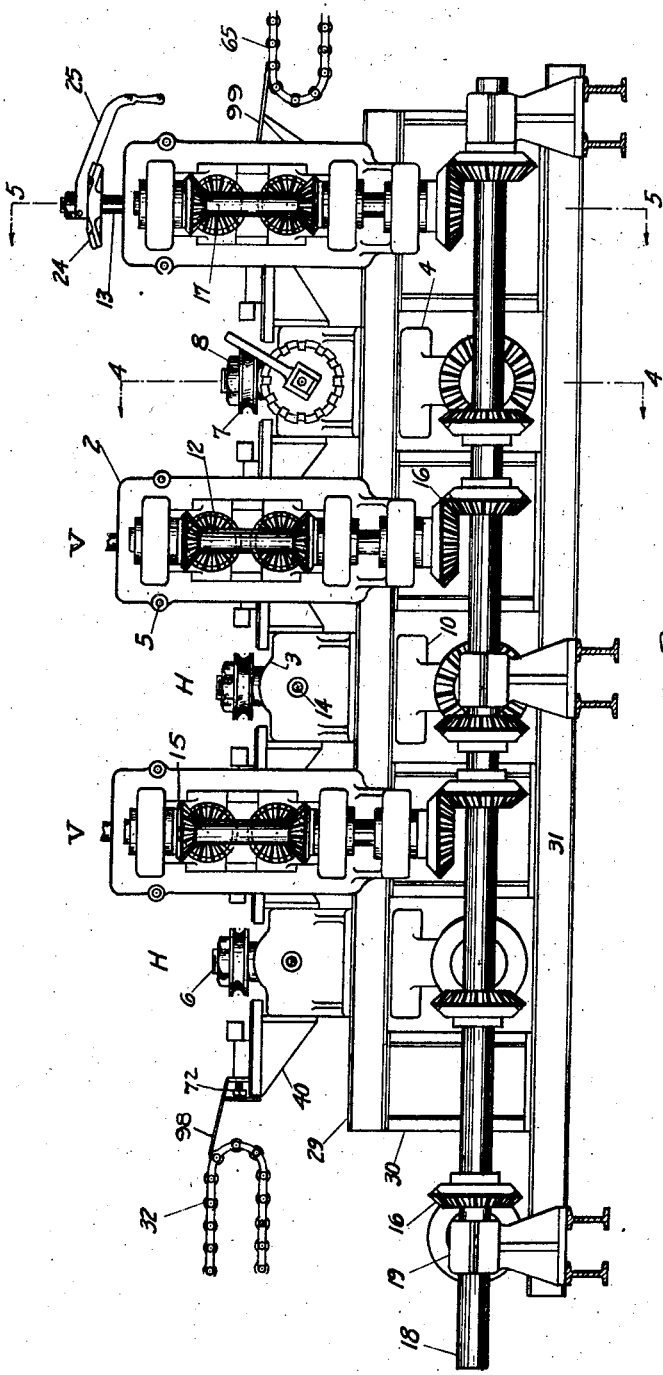
Fig. 2 is a side elevation of the mill, as viewed in the direction indicated by the arrow R in Fig. 1.
Figure 3:
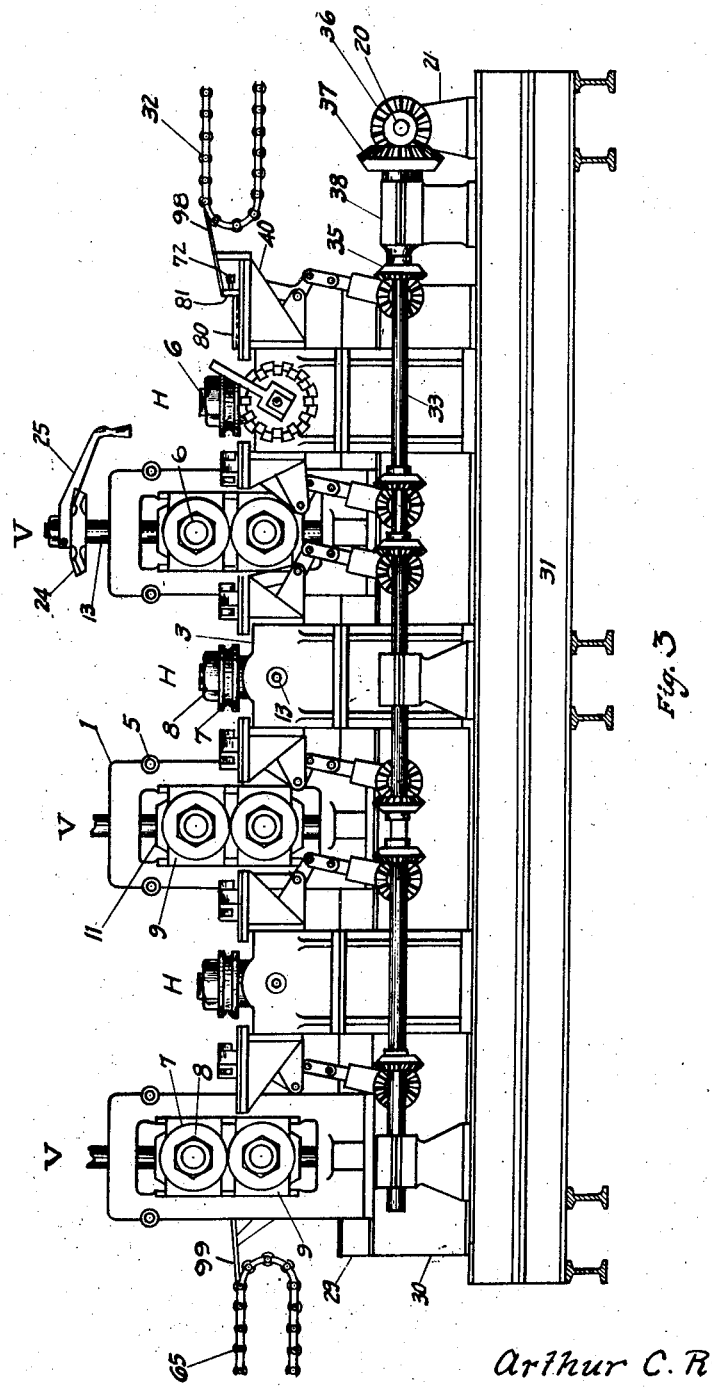
Fig. 3 is a side elevation of the mill, as viewed in the direction indicated by the arrow F in Fig. 1.

The hot blank or billet, indicated by the letter B in Fig. 1, and of a size and shape suitable for the production of a single axle, is carried by the conveyor 32 to the table 98 and deposited upon the latter, the blank then moving onto the V block 80. With the blank on the block 80, the operator will move the blank rearwardly until the rear end thereof engages the screw 72, thereby insuring that the front end of the blank will enter the first set of die rolls at a predetermined point in the periphery of the rolls. The carriage upon which the block 80 is mounted is then positively moved forwardly toward the first set of rolls in synchronism with the rotation of said rolls, said forward movement continuing until the forward end of the blank on the block 80 is gripped by the rolls. Thereafter, the rolls pull the blank off the block 80, the carriage upon which said block is mounted returning to its initial position for reception of the next blank. The blank is then rolled by the first set of die rolls to a form approaching somewhat the form ultimately desired, being elongated somewhat as the result of such rolling.

As the blank emerges from the first set of rolls, the carriage between the first and second mill stands moves towards the first set of rolls and in position to receive the blank on the V block 63 thereof, the block 64 being, at this time in elevated position, so as not to interfere with the movement of the blank. This movement of the carriage, which may be designated as the return movement, is depicted diagrammatically in Fig. 10a, in which are shown the increments of movement of the carriage corresponding to the increments of movement of the cam 48, shown in Fig. 10. This return movement of the carriage is effected by means of gears 35, shaft 34, cam 48, roller slide 52, roller 53, link 55, and bell crank lever 51, and it may be noted that as the portion of the cam 48 between the points 12 and 13 and between points 23 and 24 actuates the carriage, the corresponding movement of the carriage is small. In other words, the carriage starts on its return movement very slowly and also moves very slowly at the end of this movement.

During the return movement of the carriage the clamp block 64 is in elevated or released condition.

Figure 8:
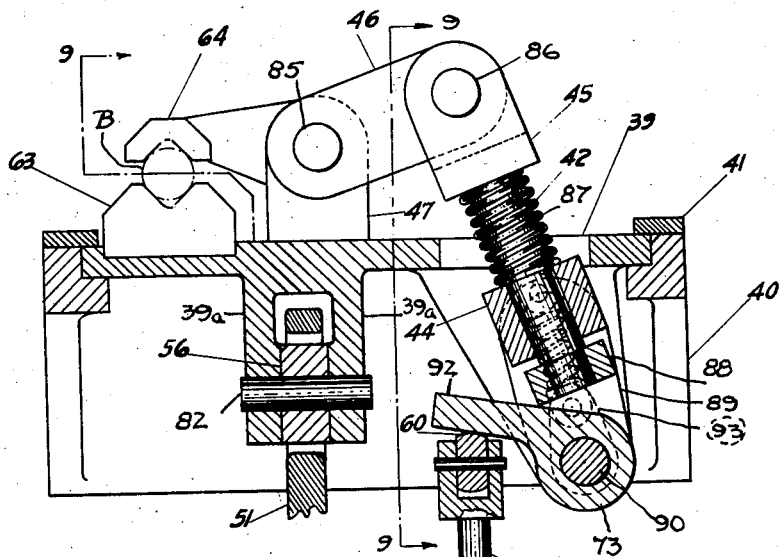
Fig. 8 is an enlarged fragmentary cross-sectional view, taken on the line 8—8 of Fig. 1, and showing the upper portion of the blank clamping mechanism.
Figure 9:
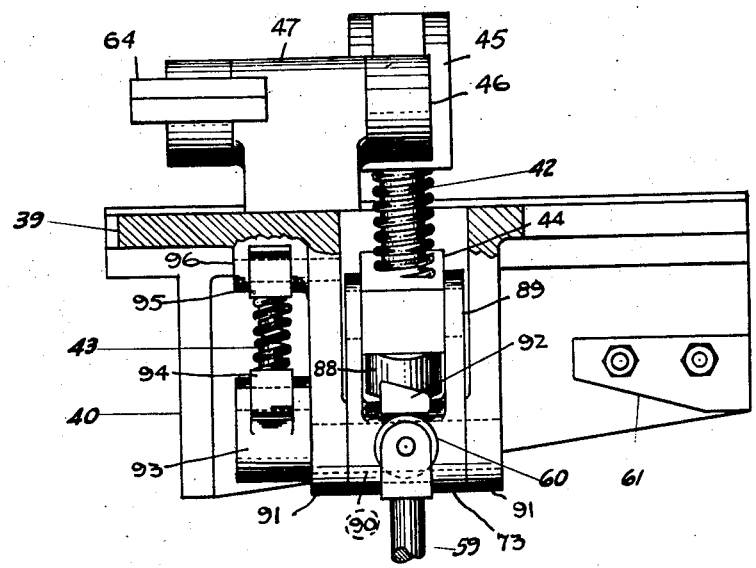
Fig. 9 is a view, taken on the line 9—9 of Fig. 8.

The carriage then starts forward, the forward movement of the carriage being depicted diagrammatically in Fig. 10b, wherein are shown the increments of movement of the carriage corresponding to the increments of movement of the cam 48, in Fig. 10. The forward movement is effected by the same means as that which effects the return movement, it being noted, however, that the actual movement is somewhat different in character than the return movement. Between the points 2 and 3, the carriage is moving at the same speed as the rolls, and at the point 2, the blank B is clamped to the V block 63 by means of the clamp 64, as shown in Fig. 8. This clamping takes place just before the blank has entirely emerged from the first set of rolls, hence it is essential that the speed of the carriage and the peripheral speed of the rolls be the same just before the clamping occurs, and for a short time after the blank has been clamped, that is until the blank has cleared the first set of rolls.

The actuation of the clamp block 64 to grip the blank and hold it immovably with respect to the carriage, is effected by the gears 35, shaft 34, cam 49, cam roller 97, push rod 59, and roller 60. As the push rod is elevated by the cam, the bell crank lever 73, as viewed in Fig. 8, is moved in a clockwise direction to the position shown in said figure. This results in a movement of the pivotal connection of the trunnion block 44 and the arms 89 of the bell crank lever past the "dead center", which is a straight line passing through the centers of shafts 86 and 90, and when this occurs, the block 64 is moved to the blank gripping position, shown in Fig. 8. The parts are locked in such position by the spring 43. The spring 42 serves to take up any variation in the diameter of the blank which is being forged.

The carriage, with the blank thus clamped thereto, proceeds towards the second set of rolls, and when the speed of the carriage is the same as the peripheral speed of said second set of rolls, as indicated by the space between points 9 and 10 in Fig. 10b, the forward end of the partly forged blank enters the second set of rolls, in registry with a predetermined point in the periphery thereof. It will be understood that the lines or impressions on the periphery of said second set of rolls bears a definite relation to those of the first set of rolls, as well as to the position of the blank which is clamped to the carriage. The succeeding sets of rolls bear impressions which are likewise definitely related to the impressions in the first and second set of rolls.

As the forward end of the blank thus enters the second set of rolls, and is seized by the latter, the carriage has moved to the point 10 (Fig. 10b), and at this point, the upper inclined surface of the bell crank lever arm 92 engages the cam 61, and is caused to move in a counter-clockwise direction from the position shown in Fig. 8. When the pivotal connection of the trunnion block 44 and the arms 89 of the bell crank lever moves past the "dead center", which has been described, the clamp block 64 is moved to release the blank, the parts being maintained in the open condition by the spring 43. The second set of rolls then pull the blank off the carriage, and the blank continues through the rolls, while the carriage continues and completes its forward movement and returns to the first set of rolls for another blank.

The operations between each of the succeeding mill stands are the same as those which occur between the first and second mill stands, and need not therefore be described.

The finished or substantially finished forging, in this case an automobile axle, is discharged by the last set of rolls onto the gravity discharge table 99, from which it is discharged onto a conveyor 65, to be carried by the latter to any desired point, for any further treatment required.

Although the operation has been described with reference to the forging of single blanks, for the production of single articles, it is to be understood that by suitable changes in the dimensions of the mill, the spacing of the stands, and the matrixing of the rolls, the apparatus may be applied to the die rolling of a series of connected forging blanks. For this purpose, the rolls will have a peripherally continuous rolling pattern to form a series of connected blanks, which may be severed from each other at the conclusion of the forging operations.

By adjusting the block 54 longitudinally of the slide 52, the movement of the carriage 39 may be adjusted so as to make the blank enter the rolls 7 early or late, as may be desired.

In Figs. 11 to 30 inclusive, the various steps in rolling a circular blank to form a pair of connected steering knuckles is illustrated, the blank being designated by the reference character KB. The appearance of the blank as it emerges from each set of rolls is shown in the views directly below the blank itself, and the corresponding cross-sections are shown at the right of these views, the rolls being fragmentarily indicated. It may be noted that the rolls are spaced apart slightly. The blank in the last view at the left is severed at the center to provide a pair of steering knuckles. It will be noted that after each pass the blank is presented to the next set of rolls with its major transverse axis at right angles to the axis of such rolls. In other words, the blank is presented in different angular positions relative to the roll axes of successive sets of rolls.

In the apparatus which has been described, since alternate sets of rolls are arranged in a plane at right angles to the remaining sets of rolls, it is unnecessary to turn the blanks between passes, for the purpose of avoiding the formation of flash on the blank.

In some cases, however, it may be necessary or desirable to have all of the sets of rolls in a common plane, and in such cases, it is necessary, in order to preclude the formation of flash, to subject the blank to a quarter-turning operation, after it emerges from each set of rolls. Mechanism for thus quarter-turning the blank is shown in Figs. 31, 32 and 33 of the drawings.

Referring to these figures, the rolls 7 of successive roll stands are arranged in a common plane, and the carriage 66 is mounted for reciprocal movement on bracket 67. The bracket has affixed thereto a plate 71 having a cam slot 101 therein, into which extends a cam roller 74. Roller 74 is mounted on a pin 102, which depends from a rack 68, mounted for transverse movement on the carriage 66. The carriage has a transverse slot 103 therein, in which the pin 102 moves during said movement of the rack. The rack 68 travels between guides 104 affixed to the carriage, and is in mesh with a gear segment 69. The rack 69 is provided with a V shaped support 105 which is adapted to receive the blank B. The support 105 rests at its ends on notched discs 106, which are rotatable on upstanding bearing brackets 107, affixed to the carriage. The gear segment 69 has rigidly secured thereto at the rear a bracket 108, to which is pivotally secured a V shaped clamp 70, which coacts with the support 105 to clamp the blank B. The bracket 108 carries all of the elements of the blank clamping mechanism shown in Fig. 8. The carriage reciprocating mechanism and blank clamping mechanism is similar to that already described with reference to Figs. 1 to 10b of the drawings, and need not be further described.

As the carriage moves forward, the blank is first clamped, as already described. Thereafter, the cam roller 74 follows the slot 101 in cam 71, and is moved transversely by said cam. This results in transverse movement of the rack 68 and consequent rotation of the segment 69 and support 105, thus rotating or indexing the blank B about 90°. Due to the mounting of the bracket 108 on the segment 69, the entire clamping mechanism rotates when the segment is rotated, so that the clamping action of the clamp 70 is not disturbed by the indexing movement. After the blank is thus indexed, the clamp 70 is released as before. Upon return movement of the carriage, the cam roller 74 returns to its initial position, returning the support 105 to its initial position.

Although the indexing or rotation of the blank has been described with reference to a mill in which successive rolls are in a common plane, it will be understood that such indexing or rotation may be used in a mill wherein successive rolls are disposed in angularly related planes, or in any case where the formation of flash is to be avoided.

It is thus seen that a method has been provided, whereby articles such as axles, shafts, steering knuckles, crank shaft blanks and the like are produced in commercially desirable quantities, and free from flash and other imperfections.

Other forms may be employed embodying the features of my invention instead of the one here explained, change being made in the form or construction herein disclosed, provided the elements stated by any of the following claims or the equivalent of such stated elements be employed, whether produced by my preferred method or by others embodying steps equivalent to those stated in the following claims.

I therefore particularly point out and distinctly claim as my invention:

1. The process of die rolling a forging blank, which consists of passing a bar of metal at a forging temperature successively through a plurality of sets of die rolls arranged in tandem, clamping said bar on a support in predetermined position thereon and before the bar has been completely discharged from the first set of die rolls, and shifting said support in synchronism with the rotation of the succeeding set of die rolls in a manner to present the partially formed bar to the said succeeding set of die rolls.

2. The process of die rolling which consists in passing a bar of metal successively through a plurality of sets of rolls arranged in tandem, clamping said bar on a support before the bar has been completely discharged from the first set of rolls and while the support is moving at the same speed as the peripheral speed of said first set of rolls, and shifting said support in synchronism with the rotation of the succeeding set of die rolls in a manner to present the partially formed bar to the said succeeding set of die rolls.

3. The process of die rolling which consists in passing a bar of metal successively through a plurality of sets of rolls, clamping said bar on a support before the bar has been completely discharged from the first set of rolls and while the support is moving at the same speed as the peripheral speed of said first set of rolls, shifting said support in synchronism with the rotation of the succeeding set of die rolls in a manner to present the partially formed bar to said succeeding set of die rolls, and releasing said bar after said succeeding set of rolls has assumed control thereof and while the bar is moving at the same speed as the peripheral speed of said succeeding set of die rolls.

4. The process of die rolling which consists in passing a bar of metal successively through a plurality of sets of die rolls, assuming control of said bar before it has been completely discharged from the first set of rolls and while moving at the same speed as the peripheral speed of said first set of rolls, and positively moving said bar to the next set of rolls in a manner to present the partially formed bar to said next set of rolls and maintaining said bar during such movement against all movement other than rotation about its axis.

5. The process of die rolling which consists in passing a bar of metal successively through a plurality of sets of die rolls, assuming control of said bar before it has been completely discharged from the first set of rolls and while moving at the same speed as the peripheral speed of said first set of rolls, positively moving said bar to the next set of rolls in a manner to present the partially formed bar to said next set of rolls while maintaining the bar during such movement against any movement in a direction transverse to the axis thereof, and relinquishing control of said bar after said next set of rolls has assumed control thereof and while the bar is moving at the same speed as the peripheral speed of said next set of rolls.

6. A rolling mill for die rolling forging blanks which includes spaced sets of rolls arranged so that the work must pass completely out of one set of rolls before entering the next set of rolls, a carrier arranged between said sets of rolls and adapted to transfer the blanks from one set of rolls to the next set of rolls, means acting automatically and independently of any act on the part of an operator for reciprocating said carrier in synchronism with said rolls, and means operating in synchronism with said rolls for clamping the blank to said carrier.

7. A rolling mill for die rolling forging blanks which includes sets of rolls arranged so that the work must pass completely out of one set of rolls before entering the next set of rolls, a carrier arranged between said sets of rolls and adapted to transfer the blanks from one set of rolls to the next set of rolls, means acting automatically and independently of any act on the part of an operator for reciprocating said carrier in synchronism with said rolls, and toggle means operating in synchronism with said rolls for clamping the blank to said carrier.

8. A rolling mill for die rolling forging blanks which includes spaced sets of rolls arranged so that the work must pass completely out of one set of rolls before entering the next set of rolls, a carrier arranged between said sets of rolls and adapted to transfer the blanks from one set of rolls to the next set of rolls, means acting automatically and independently of any act on the part of an operator for reciprocating said carrier in synchronism with said rolls, and means operating in synchronism with said rolls for clamping the blank to said carrier, and means for releasing said clamping means.

9. A rolling mill for die rolling forging blanks which includes spaced sets of rolls arranged so that the work must pass completely out of one set of rolls before entering the next set of rolls, a carrier arranged between said sets of rolls and adapted to transfer the blanks from one set of rolls to the next set of rolls, means acting automatically and independently of any act on the part of an operator for reciprocating said carrier in synchronism with said rolls, means operating in synchronism with said rolls for clamping the blank to said carrier, and means for rotating said blank about its axis as it proceeds from one set of rolls to the other.

10. A rolling mill for die rolling forging blanks which includes spaced sets of rolls arranged so that the work must pass completely out of one set of rolls before entering the next set of rolls, a carriage arranged between said sets of rolls and adapted to receive thereon and transfer the blanks from one set of rolls to the next set of rolls, cam-actuated means for reciprocating said carriage, cam-actuated means for clamping the blank to said carriage, and common drive means for the cams of both said cam-actuated means.

11. The process of die rolling which consists in passing a bar of metal at a forging temperature into a set of die rolls to form a blank approaching in form the forging ultimately desired, then gripping said blank at a point intermediate the forward end thereof and said rolls, said point having a fixed relation to a predetermined point on the periphery of the rolls through which the blank is passing, and passing the blank into a second set of rolls, driven in timed relation with said first set of rolls and at a speed synchronized with that of said second set of rolls, the point at which said blank is gripped being also fixed in relation to a predetermined point on the periphery of said second set of rolls, the blank being further acted upon by said second set of rolls to form the same into a shape more closely approaching the forging ultimately desired.

12. The method of die rolling, which comprises passing a bar of metal into a set of die rolls, gripping said bar at a point intermediate the forward end thereof and said rolls before it has completely emerged from said rolls and by means actuated in timed relation with said rolls, and, while the bar is thus gripped, advancing it into a second set of rolls, arranged in tandem with, and driven in timed relation with said first set of rolls.

ARTHUR C. RUDEN.